Figure 1:
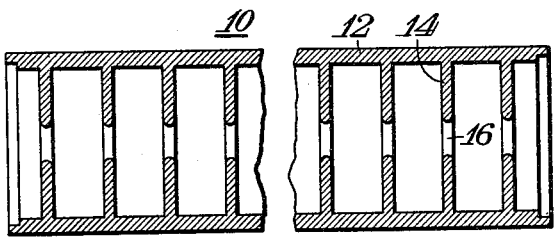

July 6, 1965    MASATAKE MURATA ETAL    3,192,609
METHOD OF MANUFACTURING HOLLOW CYLINDRICAL MEMBERS
WITH APERTURED INTERNAL PARTITIONS
Filed Feb. 26, 1962

United States Patent Office 3,192,609
Patented July 6, 1965

3,192,609
METHOD OF MANUFACTURING HOLLOW CY-
LINDRICAL MEMBERS WITH APERTURED
INTERNAL PARTITIONS
Masatake Murata, Prefecture of Aichi, and Shigeyuki
Ikeda, Nagoya, Prefecture of Aichi, Japan, assignors to
Shin-Mitsubishi Jukogyo Kabushiki Kaisha, Nagoya,
Japan, a corporation of Japan
Filed Feb. 26, 1962, Ser. No. 175,597
Claims priority, application Japan, Feb. 27, 1961,
36/6,034
3 Claims. (Cl. 29—155.5)

This invention relates to a method of manufacturing a hollow, cylindrical member including therein a plurality of apertured internal partitions and the products resulting from the same.

Such members may be advantageously used in producing linear accelerators. As is well known to those skilled in the art, a linear accelerator is a metallic tube in which electrons are accelerated through a series of small gaps usually in the form of cavity resonator in the high frequency range so arranged and spaced that, at a specific excitation frequency, the stream of electrons on passing through the successive gaps gains additional energy from an electric field in each gap. Because of the use of the cavity resonator, the tube should have its inside dimension very critical. It is very desirable to provide a method of manufacturing such metallic tubes usable as linear accelerators with a high degree of accuracy and in simple manner.

Accordingly, an object of the invention is to provide an improved method of manufacturing a hollow, cylindrical member including a plurality of apertured internal partition disks attached to the internal wall thereof with a high degree of accuracy and in reliable simple manner.

A more specific object of the invention is to provide an improved method of manufacturing a metallic tube especially suitable for use in a linear accelerator, in reliable simple manner.

An additional object of the invention is to provide metallic tubes used in producing linear accelerators.

According to the invention there is provided a method of manufacturing a hollow, cylindrical member including a plurality of apertured partition disks attached on the internally peripheral surface thereof, said method comprising the steps of preparing a plurality of apertured partition disks and a plurality of hollow, cylindrical spacer elements having respective predetermined dimensions with a high degree of accuracy, and sandwiching each of said plurality of apertured partition disks between one pair of adjacent hollow, spacer elements in lengthwise aligned relationship to form a single cylindrical member, and depositing a cylindrical shell around said single cylindrical member by electroforming technique to join said partition disks and said spacer elements in one unit with said hollow, cylindrical spacer elements remaining as they are inside the cylindrical shell.

In order to improve the anticorrosive property of the finished product, both the apertured partition disks and the hollow, cylindrical spacer elements may be preferably plated with any suitable metal having an anticorrosive property.

Figure 2:
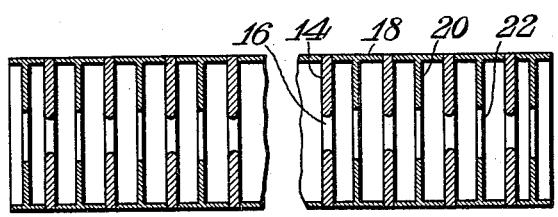
Figure 3:
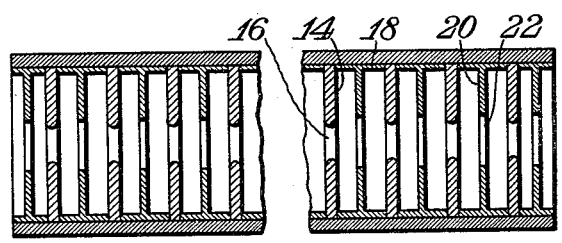
Figure 4:
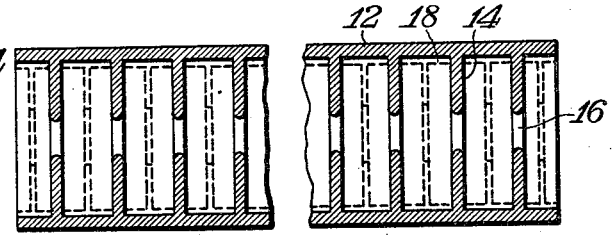
Figure 5:
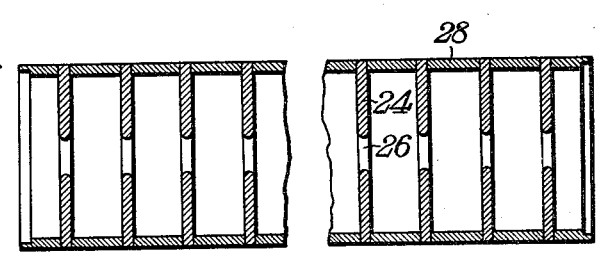
Figure 6:
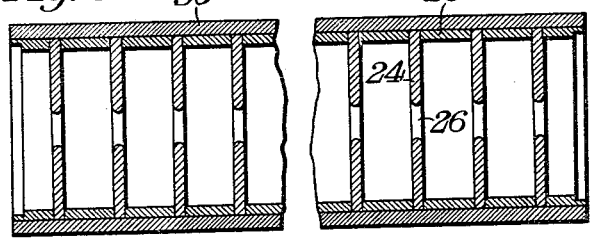

The invention will become more readily apparent from the following detailed description taken in conjunction with the accompanying drawings in which:

FIG. 1 shows diagrammatically a fragmental view, in longitudinal section of a metallic tube for a linear accelerator;

FIGS. 2 through 4 show diagrammatically a fragmental view illustrating, in longitudinal section, the various steps of manufacturing a metallic tube for a linear accelerator in accordance with the prior art technique; and FIGS. 5 and 6 show diagrammatically a fragmental view illustrating, in longitudinal section, the various steps of manufacturing a metallic tube for a linear accelerator in accordance with the teachings of the invention.

While the invention will be principally described in terms of a metallic tube for a linear accelerator, it is to be understood that it is equally applicable to the production of other long metallic tubes including a plurality of apertured partition disks in spaced relationship jointed to the internal walls thereof and required to have critical inside dimensions.

Referring now to FIG. 1 of the drawings, there is diagrammatically illustrated a general construction of a metallic tube for a linear accelerator. A metallic tube for a linear accelerator generally designated by the reference numeral 10 comprises an elongated, circularly cylindrical shell 12 and a plurality of apertured partition disks 14 disposed equidistantly in parallel relationship to each other and jointed to the internal wall of the shell. As shown in FIG. 1, the partition disks 14 are provided at their centers with circular apertures 16 substantially aligned with each other lengthwise of the tube 10. Thus, the apertured partition disk 14 divide the interior of the tube 10 in a plurality of spaces which, in turn, communicate with each other through the apertures 16.

As is well known, the metallic tube 10 or a linear accelerator includes at one end an electron gun (not shown) for emitting and directing a stream of electrons toward the other end thereof. In the accelerator the electrons emitted from the electron gun may be accelerated to have linear velocities approaching the velocity of light whereby they will gain energy corresponding to several million electron volts to several ten billion electron volts. To this end, a flow of ultra-high-frequency energy can be passed through the interior of the accelerator, and positive and negative charges can be applied to the spaces divided by the apertured partition disks 14 whereby the negatively charged electrons will be accelerated. It is to be noted that the phase of the applied electric field should be varied at a very high rate in unison with the travel of the electrons in such a manner that the field will always accelerate the electrons at any point on the paths of the travelling electrons. For this reason, the field is phase-modulated with an ultra-high-frequency. The ultra-high-frequency depends critically upon the inside dimension of the accelerator.

In certain circumstances, any variation in the frequency may cause the electric field to have the opposite phase with which the same will decelerate the electrons. Regarding their inside dimension the accelerator is, therefore, required to have a high degree of accuracy reaching the order of microns.

Also it is to be understood that, in order to maintain the interior of the accelerator vacuum the accelerator must be free from any leakage. In addition, it should necessarily have a mechanical strength sufficient to have continuously the high degree of accuracy as above pointed out.

For the reason that the aforesaid requirements should be met, it is very difficult to mechanically work a long metallic tube material intact into a metallic tube for a linear accelerator. To avoid this difficulty various working methods have been heretofore proposed. One of such methods comprises the steps of preparing separately components required to form a metallic tube and assembling them into the tube and will now be described with reference to FIGS. 2 through 4 wherein the same reference numerals have been employed to identify the components corresponding to those illustrated in FIG. 1.

As shown in FIG. 2, a number of apertured partition copper disks 14 each is sandwiched between one pair of adjacent, circularly cylindrical spacer 18 in lengthwise aligned relationship. The partition disk 14 has been previously prepared to include a central circular aperture 16 of a predetermined inside diameter and to have a predetermined outside diameter. Also the cylindrical spacer 18 has previously prepared to include an inwardly projecting web 20 jointed to the internal surface thereof at the substantially mid-point on its length, the web being provided at the central portion with a circular aperture 22 slightly larger than the aperture 16 on the disk 14 in inside diameter. The spacer 18 should have its outside diameter equal to that of the disk 14 and may be preferably made of aluminum. It is to be noted that both the disks and the spacers shall be prepared with a very high degree of accuracy for the reasons previously pointed out.

The structure thus formed is then jointed into one unit by any suitable fastening means. Around the unitary structure a copper layer of desired thickness is deposited by electroforming technique. The resulting structure is illustrated in FIG. 3.

After the removal of fastening means used, the structure with the copper layer is subject to any suitable chemical treatment for dissolving out the spacers 18 as shown at dotted line in FIG. 4.

In order to provide the complete metallic tube, the outer periphery and ends of the structure thus treated may be finished, washed and dried.

According to the method as above described, each of the partition disks and the spacers can be easily tested for dimension. The resonance frequency of the disk also can be easily tested. However, each of spaces divided by the partition disks within the finished tube is impossible to be tested for both dimension and resonance frequency.

In addition, the aforesaid method is significantly disadvantageous in that, during the dissolving out operation the internal peripheral surface of the tube may be dissolved into a treating solution resulting in error of the inside dimension of the tube. It is not only very difficult to control that undesired dissolving out of the internal peripheral surface of the tube but also it can not be ascertained whether or not such dissolving out will have occurred. For these reasons, the aforesaid method can hardly be expected to provide linear accelerators with a high degree of accuracy.

The invention has eliminated the abovementioned difficulties by avoiding the use of the dissolving out step which detrimentally affects the inside dimension of the finished product. According to the invention apertured partition disks such as the disks 14 shown in FIG. 4 are formed as individual components as in the conventional method as previously described and spacers for the disks are formed as hollow, cylindrical elements of short length. As in the previous case a number of such partition disks each is sandwiched between one pair of adjacent, cylindrical elements to form an elongated cylindrical member. Around the cylindrical member a cylindrical shell is deposited by electroforming technique to provide a metallic tube for a linear accelerator. It is to be noted that the spacers or the hollow cylindrical elements remain as the internal wall of the completed tube within the same.

The invention will now be, in more detail, described with reference to FIGS. 5 and 6. As shown in FIG. 5, a number of apertured partition disks 24 each is sandwiched between one pair of adjacent circularly tubular spacer 28 in lengthwise aligned relationship. The partition disk 24 has been previously prepared to include a central circular aperture 26 of a predetermined inside diameter and to have a predetermined outside diameter. A length of suitable tube material could be cut into short tube elements which, in turn were mechanically worked to have the required inside and outside dimensions. It is to be understood that both the disks and the tube elements should be prepared with a very high degree of accuracy. For the purpose of producing a linear accelerator, the material for both the disk and the spacer is preferably copper. The structure comprising the number of apertured partition disks 24 and the number of spacers 28 disposed alternately is then joined into a single tubular member by any suitable fastening means. For example, with the disks 24 and the spacers 28 maintained in centered state, they can be joined to each other by a long bolt (not shown) extending through the apertures 26 on the disks 24 and the spacers 28 and including a pair of nuts (not shown) at both ends respectively whereby a unitary structure is formed. Then the unitary structure with the bolt and the nuts is subject to electroforming treatment to deposit on the outer periphery thereof a layer 30 of suitable metal, such as copper, of a suitable thickness. The thickness may be several millimeters. In this way a single metallic tube is formed comprising the number of apertured partition disks 24 and the tubular spacers 28 disposed alternately in intimate contact with each other and rigidly carried by a circularly cylindrical shell consisting of the electroformed layer 30. The bolt and nuts used may now be removed. The outer periphery and end portions of the tube thus produced is mechanically finished to provide the complete metallic tube suitable for use in a linear accelerator.

Therefore, it will be appreciated that, on the contrary to the method as previously described in conjunction with FIGS. 2 through 4, the present method yields a metallic tube including a number of spacers remaining as parts of the wall thereof.

In addition, the invention comprises no use of chemical treatment which detrimentally affects the inside dimension of the finished product. This makes it possible to use the aperture partition disks and spacers previously plated with any suitable metal having an anticorrosive property resulting in improvement in anticorrosive property of the finished linear accelerator.

Since a linear accelerator is operated in evacuate state the same should be completely vacuum-tight. This is accomplished by the provision of the external shell 30. It is to be noted that the shell should be a wall thickness sufficient to maintain the very high degree of accuracy.

From the foregoing it will be appreciated that the invention has provided a method of manufacturing a hollow, cylindrical member including provided on the internal periphery a plurality of apertured partition disks as in a linear accelerator which has been previously difficult to be produced, in a simple and easy manner with a very high degree of accuracy. The apertured partition disks and the hollow cylindrical spacers can be preliminarily tested for both dimension and resonance frequency before assembling operation. The tested components maintain the high degree of accuracy after the final product has been completed. Accordingly the invention provides a linear accelerator reliable in operation.

While the invention has been described in conjunction with the preferred examples thereof it is to be understood that various changes and modification may be made without departing from the spirit and scope of the invention.

What we claim is:

1. A method of manufacturing a hollow, cylindrical member including a plurality of apertured partition disks attached on the internal periphery thereof, said method comprising the steps of preparing a plurality of apertured partition disks and a plurality of hollow, cylindrical spacer elements having respective predetermined dimensions with a high degree of accuracy, sandwiching each of said plurality of apertured partition disks between one pair of adjacent hollow, cylindrical spacer elements in lengthwise aligned relationship to form a single cylindrical member, and depositing a cylindrical shell around said single cylindrical member by electroforming technique to join said partition disks and said spacer elements into one unit with said hollow cylindrical spacer elements remaining as they are inside said cylindrical shell.

2. A method as claimed in claim 1, wherein said plurality of apertured partition disks and said hollow, cylindrical spacer elements are previously plated with a metal having an anticorrosive property.

3. A method of manufacturing a hollow cylindrical member having a plurality of apertured partition disks therein, which comprises the steps of preparing a plurality of apertured partition disks and a plurality of hollow cylindrical spacer elements having the same outside dimensions as said disks, assembling said disks and spacer elements with a disk between successive spacer elements and with said spacer elements in axial alignment with one another, securing said spacer elements and disks in assembled relation and electro-depositing a cylindrical shell around said assembly, said shell being bonded to the external surfaces of said cylindrical elements and to the disks to bond said disks and cylindrical elements permanently into a single unit and form a continuous air-impervious shell around said assembled disks and cylindrical spacer elements.

References Cited by the Examiner
UNITED STATES PATENTS 2,761,828 9/56 Eldredge et al.
3,070,873 1/63 Gordon et al. _____ 29—155.5

WHITMORE A. WILTZ, Primary Examiner.
NEDWIN BERGER, Examiner.